Nov. 8, 1966 HIDEO IZUMI 3,284,676

BILATERALLY BISTABLE SEMI-CONDUCTOR DEVICE

Filed Dec. 21, 1961 3 Sheets-Sheet 1

Hideo Izumi
INVENTOR.

BY
Watson, Cole, Grindle & Watson
Attorneys

Nov. 8, 1966 HIDEO IZUMI 3,284,676

BILATERALLY BISTABLE SEMI-CONDUCTOR DEVICE

Filed Dec. 21, 1961 3 Sheets-Sheet 2

INVENTOR
Hideo Izumi

BY Watson, Cole, Grindle & Watson
ATTORNEYS

INVENTOR
Hideo Izumi

BY Watson, Cole, Grindle & Watson
ATTORNEYS 3,284,676

BILATERALLY BISTABLE SEMI-CONDUCTOR DEVICE

Hideo Izumi, Tokyo, Japan, assignor to Nippon Telegraph and Telephone Public Corporation, Tokyo, Japan, a corporation of Japan Filed Dec. 21, 1961, Ser. No. 161,009
Claims priority, application Japan, Dec. 26, 1960, 35/50,224
8 Claims. (Cl. 317—234)

This invention relates to a bilaterally bistable semiconductor device.

The present invention relates to a device made by forming regrown layers of silicon containing gold onto both surfaces of a thin single crystal silicon plate by an alloying method so as to have favorable negative resistance characteristics at the room temperature and in a comparatively low voltage range and to have such character as is suitable for logic elements and telephone line elements for computers and electronic telephone exchanges.

An object of the present invention is to provide a semiconductor device having a favorable negative resistance at the room temperature (not very low temperature) and in a comparatively low voltage range.

The semi-conductor according to the present invention shall be explained in detail with reference to the examples shown in the accompanying drawings.

*Example 1*

A small piece of a single crystal of silicon finished so that the surface may be a crystallographic 111 surface, the size after being etched and perfectly water-washed may be a square of a side of 1 to 2 mm. and the thickness may be about 100 microns is made by cutting a single crystal of silicon in which the conduction type is an n-type as in n-type silicon of a good quality and high purity made by the floating zone refining method, the specific resistance is 1000 ohm cm. or higher and the life time is about 1/1000 second or longer. Two gold strips are made of gold containing about 1% antimony 30 to 50 microns thick and 100 to 1000 microns wide and cut to a proper length (of about 5 mm.). These strips are lightly pressed and fused to both sides of the single crystal of silicon by means of a proper jig so as to be opposed to each other but not to be in direct contact with each other.

Figure 1:
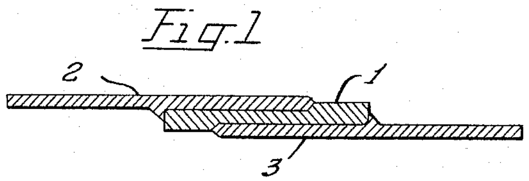
FIGURE 1 is a sectional view of a device according to the present invention showing a basic form.

When such piece is heated for about 10 minutes at a temperature of about 400° C. in a vacuum or an inert gas and is then taken out, the strips of gold containing antimony will have perfectly integrally alloyed with the above mentioned small piece of a single crystal of silicon. In such case, care should be taken lest the two gold strips should be electrically directly fused with each other. FIGURE 1 is a sectional view of the device in such case. In the drawing, 1 is a single crystal piece of silicon and 2 and 3 are gold containing antimony.

When gold containing antimony is alloyed to the single crystal of silicon, in case it is cooled from the maximum temperature in the fusing process, the silicon which melted into the gold at the maximum temperature will be first selectively deposited on the matrix single crystal of silicon.

Thus regrown layer of the single crystal of silicon containing antimony and gold will be made, upon which the gold is deposited and therefore a favorable regrown layer will be made.

The dimensions of the present device are not to be limited to the above mentioned dimensions but the final electric characteristics will be different depending on the variation of the size and thickness. Also the temperature at which gold is alloyed is not limited to the above mentioned 400° C. but can be selected to be a proper temperature in the range of 380 to 700° C. However, in such case, it will be necessary to properly vary such dimensions as the thicknesses of the silicon piece and gold strip in accordance with the alloying temperature.

The device made as mentioned above is subjected to such after-treatments as etching and water-washing and is sealed in a proper atmosphere (in a vacuum or a clean gas) to complete the device.

Figure 2:
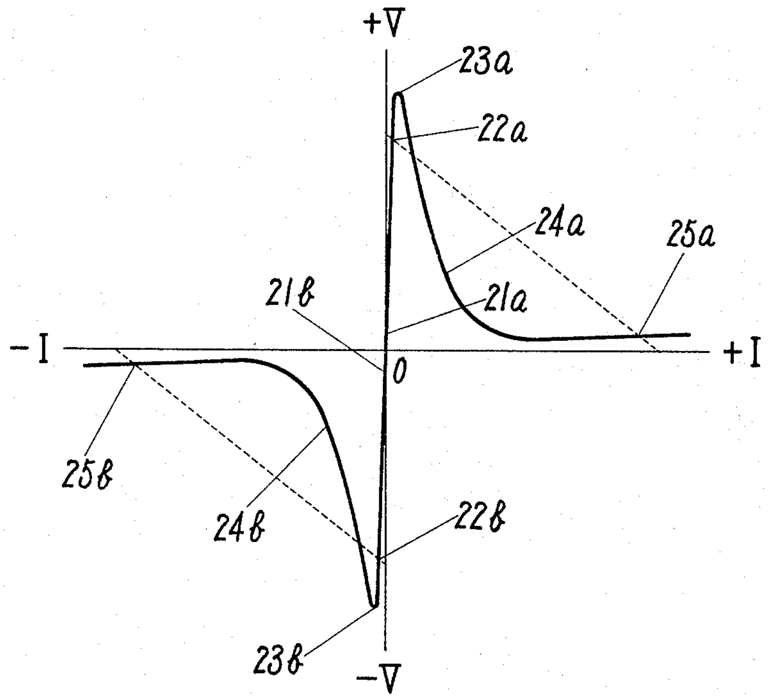
FIGURE 2 is a diagram showing the relation between the voltage and current of the electric characteristics of the device shown in FIGURE 1.

The electric characteristics (voltage-current characteristics) of the present device at the room temperature are, as shown in FIGURE 2, such that, when the voltage applied to the terminal of the device increases from 0, while the initial voltage is low, the electric resistance in the device will be so high as to hardly pass the current and will show such characteristics as at 21*a* and 22*a* in the diagram but that, when a fixed voltage (23*a* in the diagram) determined by the device is reached, the electric resistance of the device will quickly decrease, the voltage will reduce as at 23*a*, 24*a* and 25*a* of the curve in the diagram, and at the same time the current will increase and negative resistance characteristics will be shown. Therefore, when the device is connected to a load circuit having such resistance as is shown by the dotted line in FIGURE 2, there will be able to be made a bistable action of obtaining stable points at the two points of 22*a* and 25*a* in the diagram. As such devices are made the same on both surfaces of the single crystal of silicon, even when the direction of passing the current is reversed, the same electric characteristics will be kept and such voltage-current characteristics as at 22*b*, 23*b*, 24*b* and 25*b* in FIGURE 2 will be obtained. Therefore, when it is connected to a load circuit of the same resistance as in the normal direction, stable points will be obtained at the two points of 22*b*, and 25*b*. After all, the present device can perform a bilaterally bistable action.

In obtaining a device of such characteristics, the resistivity of the n-type single crystal of silicon to be used is not limited to 1000 ohm cm. but, if it is higher than 300 ohm cm., a device having substantially bistable characteristics will be obtained. However, the higher the resistivity of the single crystal which is used, the better the results. Also the lifetime of the carrier injected into the crystal is not specifically limited to be longer than 1/1000 second but may be shorter. However, the crystal of a longer lifetime means that useless impurities mixed in are less. This means naturally that the voltage at 25*a* (also at 25 *b*) in FIGURE 2 is lower. Such device will be advantageous when used as a switch element.

Further, even when the electrode is alloyed by using gold plates in which is mixed a small amount of one or more of the elements of the V group such as phosphorus and arsenic instead of the above mentioned gold plates containing antimony, the same object will be able to be attained.

Also the dimensions of the present device are not to be limited to the above mentioned values but may be reduced to the working limits and may also be made larger than are required by the voltage and current. However, they do not make any substantial difference.

*Example 2*

In the above mentioned example, an n-type single crystal of silicon of a high purity is used. However, even when a p-type single crystal of silicon of a high purity is used instead of the n-type, the same object will be able to be obtained. That is to say, when a small piece of a single crystal of silicon is made the same as in the case of Example 1 by using a p-type single crystal of silicon of a high purity and good quality in which the conduction type is a p-type, the resistivity is 1000 ohm cm. or higher and the lifetime of the injected carrier is 1/1000 second or longer and a gold plate containing about 1% gallium is used for the regrown layer instead of the gold plate containing antimony in Example 1 and is alloyed at the same dimensions and temperature as therein, a regrown layer of silicon containing gallium and gold will be made on the matrix single crystal of silicon, the gold plate containing gallium will make a perfect contact with the p-type single crystal of silicon and the gold will operate as a favorable electrode. When it is etched and sealed, the device will be completed.

The electric characteristics of the thus made device are substantially similar to those of the device in which the n-type single crystal of silicon is used.

It is the same as in the case of Example 1 that the resistivity of the p-type single crystal of silicon which is used is not limited to the above mentioned 1000 ohm cm., but that, if the resistivity is higher than 300 ohm cm., a device having bistable characteristics will be obtained. Further, the element to be added to the gold to be used for the regrown layer may be not only gallium but also any one or a combination of two or more of such III group elements as boron and aluminum. It is also the same as in Example 1 that the dimensions of the gold plate for the regrown layer and of the piece of the single crystal of silicon are not to be limited to the above mentioned dimensions but may be other than the above.

*Example 3*

In the above mentioned Examples 1 and 2, the electrode in the present device is made by alloying small strips of gold plates to both surfaces of a small piece of a matrix single crystal of silicon of a high purity and good quality. When the single crystal of silicon which is used is of an n-type, a V group element will be added to the gold plate and, when it is of a p-type, a III group element will be added so that the recrystal made in alloying the electrode may be made a single crystal of silicon of the same conduction type as of the matrix single crystal layer of silicon and a favorable contact may be thereby obtained.

In the present example, pure gold is used for the gold plate to be used for the electrode. That is to say, when ribbons made of pure gold are alloyed by the same method at the same size and temperature as in Example 1 to both surfaces of the same small piece of a single crystal of silicon as in the above example cut out of a single crystal of silicon which is of an n-type or p-type as described in the Examples 1 and 2 and in which the resistivity is higher than 300 ohm cm. or is preferably over 1000 ohm cm. and the lifetime of the injected carrier is long enough, in case they are cooled from the maximum temperature, the silicon once melted into the gold will first grow as a regrown layer on the matrix single crystal of silicon while containing a small amount of gold. In the regrown layer thus containing gold, due to an acceptor center and donor center which are deep levels (levels made near the center of a forbidden band in an energy band model) made by the gold, the carriers which have contributed to conduction in the matrix crystal or the electrons in the n-type and the positive holes in the p-type will be caught by the level of gold and their number will remarkably decrease and, as a result, the regrown layer will be a single crystal layer of silicon very high in resistivity. As such layer will be formed in each of the gold terminals on both sides of the matrix crystal, the formation of the present device will be as follows:

Gold plate–regrown layer of silicon–matrix silicon crystal–regrown layer of silicon–gold plate.

The same as in Example 1, the dimensions of the single crystal of silicon and the gold plate and the alloying temperature in such case are not to be specifically limited to the above mentioned values.

When an electric current is passed through this device, the high resistance of the regrown layer will be added as well as the resistance of the matrix crystal and therefore at first the resistance of the device will be so high that, if the current is to increase a little from 0, its terminal voltage will quickly increase and will be as at **21*a* and 22*a* of the curve in FIGURE 2 but its rise will tend to be quicker than in the case of Example 1. When the current is thence increased until the maximum value 23*a* of the voltage is exceeded, a negative resistance will be produced and the voltage will drop as at 23*a*, 24*a* and 25*a*. Therefore, if a proper load is connected, the device will become stable at 22*a* and 25*a*** and will act as a bistable device. It is the same as in Example 1 that, as both terminals are symmetrical, the device has the same characteristics in both directions.

*Example 4*

Each of the above mentioned three examples is of the case that a pair of gold electrodes are attached to one crystal piece so as to form a pair of devices. However, as the electric characteristics of the present device, the high resistance ranges (which are the parts of **21*a*–22*a* and 21*b*–22*b*** in FIGURE 2) show such high electric resistance that, in case the devices are to be used in parallel, it will be convenient to simultaneously make several devices on one crystal piece from the first.

The characters of the single crystal of silicon and the gold plate may be of any one of the three combinations in the above mentioned Examples 1, 2 and 3. Therefore, it is needless to say that the "single crystal of silicon" and "gold plate" merely so called in this example are of the characters mentioned in the above examples.

Figure 3:
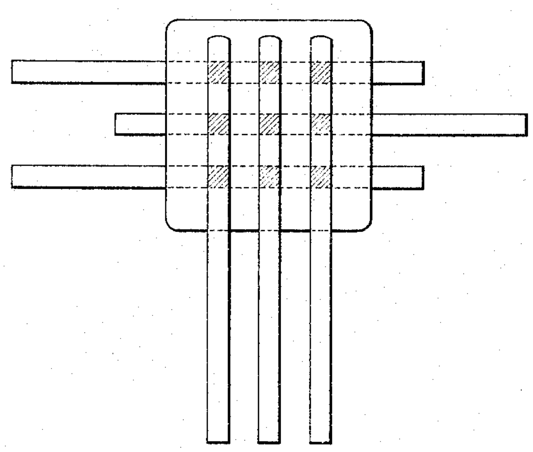
FIGURE 3 is a view of the elementary devices of the present invention as arranged in a matrix (of 3 x 3).

Such single crystal of silicon is etched and is then finished to be a square plate of sides of 2 to 3 mm. and of a thickness of about 100 microns. As in FIGURE 3, three properly long fine gold ribbons each about 50 microns thick and 100 to 300 microns wide are arranged in parallel at intervals of 300 to 500 microns on each surface of the perfectly water-washed crystal plate so as to be at right angles with those on the other side of the plate. Those six ribbons on both surfaces are pressed to be fused by means of a proper jig so as not to be in contact with one another. When they are heated and alloyed in the same manner as in the above mentioned examples, the same devices as in the above mentioned examples will be made in the form of matrices in the nine hatched parts in FIGURE 3. Therefore, when this product is subjected to such after-treatment as etching and is sealed through six lead wires by any proper means (not specified), a unit having nine elementary devices will be able to be made. When such unit having many devices is used, troubles will be omitted and at the same time the rate of utilization of the space will be able to be elevated.

It is needless to say that the dimensions of the device or the thickness of the crystal of silicon and the size and intervals of the gold ribbons in such case are not to be limited to the dimensions mentioned herein but such arrangement may only be made.

The number of the devices in the arrangement is shown herein to be in the form of 3 x 3. But it is also needless to say that generally the form of $m \times n$ wherein $m$ and $n$ are any positive integers may be taken.

*Example 5*

The crystallographic direction of the single crystal of silicon used in the above four examples is such wherein the (111) crystallographic surface is cut so as to substantially coincide with the upper surface. In the present example, a (100) crystallographic surface is used.

That is to say, a single crystal (of an n-type or p-type) of silicon of a high purity having the same electric characteristics as are used in any of the above Examples 1, 2 and 3 is cut so that its upper and lower surfaces may be crystallographically (100) surfaces, is etched and water-washed so as to be a square of sides 1 to 2 mm. long and about 1 mm. or less thick and is finished so as to have such thickness as is mentioned hereinafter. A gold wire of a diameter of about 0.5 mm. as cut to be of a proper length (preferably 3 to 5 mm.) is lightly pressed and held on each surface of said crystal piece by means of a proper jig so as to be substantially vertical to the surface of the crystal piece so that the centers of the gold wires on both surfaces may well coincide with each other above and below the crystal piece of silicon. In such case, it is preferable that the cut surface of the gold wire to be used is so cut as to project a little toward the center part of the wire so that the center lines of both upper and lower wires may well coincide with each other even after they are alloyed.

It is in the case of using an n-type or p-type single crystal of silicon that gold wires are used in the above. Pure gold wires can be used in common in the above mentioned two cases.

Figure 4:
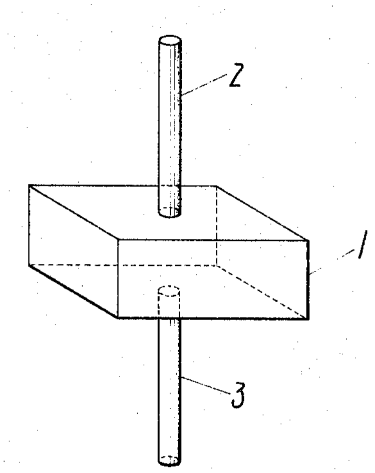
FIGURE 4 is a view showing the manner of holding a pyramidal electrode.

FIGURE 4 shows the manner of such holding. In the drawing, 1 is a single crystal of silicon and 2 and 3 are gold wires.

Figure 5:
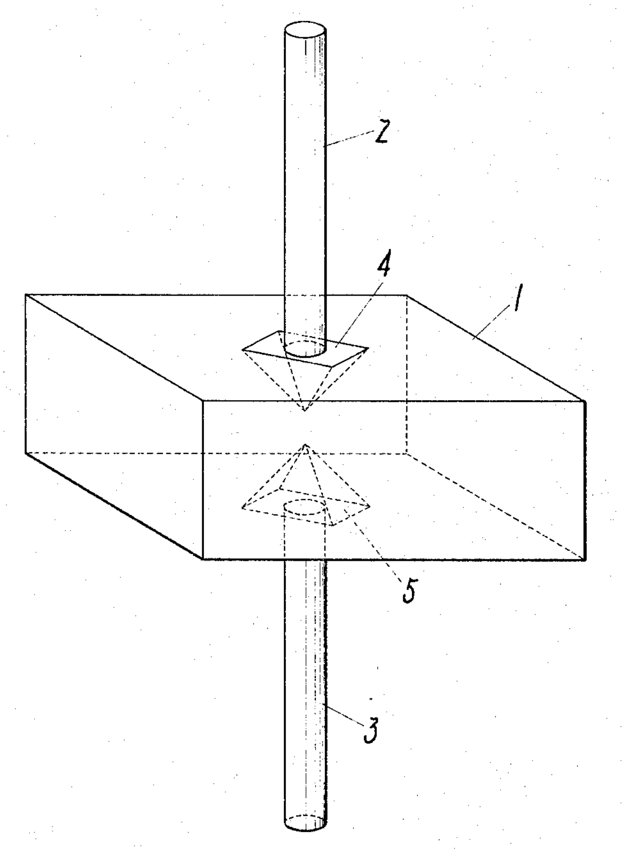
FIGURE 5 is an explanatory view of the form of the pyramidal electrode element.

When the device assembled in such manner is held at a maximum temperature of about 400° C. for 10 to 30 minutes by gradually elevating the temperature in a vacuum or a pure inert gas and is then cooled and taken out, the gold wires will be alloyed with the single crystal of silicon in the contact parts and will be fixed to the single crystal of silicon. In such case, the alloyed part will be a tetragonal pyramid toward the inside of the single crystal of silicon as shown in FIGURE 5. 4 and 5 in FIGURE 5 are such parts.

When an electric current is passed through such device, the voltage-current characteristics will be substantially the same as in FIGURE 2 and the device will have negative resistance characteristics bilaterally and will be able to operate as a bilaterally bistable device. When such form is taken, the approaching part of the two gold electrodes will become smaller and therefore the capacity of the device will be able to be reduced. Thus, there is an advantage that the switching time can be reduced.

Further, the thickness of the single crystal of silicon located between the two tetragonal pyramidal gold electrodes will vary with the thickness of the single crystal of silicon and the thickness and length of the gold wire used in the present device and the variation of the temperature and time in alloying. Therefore, by properly varying them from the above mentioned values, the thickness of the single crystal layer of silicon between the tips of the gold electrodes can be selected and therefore the electric characteristics or the maximum voltage of the device can be selected. The gold wire for electrodes that can be used in this example may be of not only pure gold but also, as described in Examples 1 and 2, gold containing a small amount of such V group element as antimony when the single crystal of silicon to be used is of an n-type or gold containing a small amount of such III group element as gallium when the single crystal of silicon is of a p-type.

What is claimed is:

1. A semiconductor device having bilaterally bistable characteristics comprising a thin plate of a single crystal of n-type silicon having a specific resistance of more than 300 ohm cm. and the thickness of less than 250 microns, and at least two regrown layers of silicon having at least one flat portion, the layers opposed to each other through said thin plate of silicon so as to cause said regrown layers to be arranged in parallel with each other in the cross section, said regrown layers containing gold and at least one V group element and having higher specific resistance than that of the matrix single crystal of silicon and thickness of less than 1.2 microns.

2. A semiconductor device having bilaterally bistable characteristics comprising a thin plate of a single crystal of p-type silicon having a specific resistance of more than 300 ohm cm. and the thickness of less than 250 microns, and regrown layers of silicon having at least one flat portion to be opposed to each other through said thin plate of a single crystal of silicon so as to cause said regrown layers to be arranged in parallel with each other in the cross section, said regrown layers containing gold and at least one III group element and having higher specific resistance than that of the matrix single crystal of silicon and a thickness of less than 1.2 microns.

3. A semiconductor device having bilaterally bistable characteristics comprising a thin plate of a single crystal of silicon having a specific resistance of more than 300 ohm cm. and the thickness of less than 250 microns, and regrown layers of silicon in the shape of a plurality of elongated ribbons being arranged in parallel with one another on one surface of said thin plate and a further plurality of ribbons being arranged on the other surface of said thin plate in parallel with one another to cross at right angles with the other plurality of ribbons, and opposed through said thin plate of a single crystal of silicon to any of said ribbons on said one surface so that the ribbons on both surfaces are arranged in parallel with each other in the cross section, said regrown layers containing gold and having higher specific resistance than that of the matrix single crystal of silicon and a thickness of less than 1.2 microns.

4. A semiconductor device having bilaterally bistable characteristics comprising a thin plate of a single crystal of n-type silicon having a specific resistance of more than 300 ohm cm. and the thickness of less than 250 microns, and regrown layers of silicon in the shape of elongate ribbons, a first plurality of said elongate ribbons being arranged in parallel with one another on a first surface of said thin plate, and a further plurality of the ribbons being arranged on the other surface of said thin plate in parallel with one another and crossed at right angles with the first plurality of ribbons and opposed through said thin plate therewith so that the ribbons on both surfaces are arranged in parallel with each other in cross section, said regrown layers containing gold and at least one V group element and having higher specific resistance than that of the matrix single crystal of silicon and a thickness of less than 1.2 microns.

5. A semiconductor device having bilaterally bistable characteristics comprising a thin plate of a single crystal of p-type silicon having a specific resistance of more than 300 ohm cm. and the thickness of less than 250 microns, and regrown layers of silicon in the shape of elongate ribbons, a first plurality of said elongate ribbons being arranged in parallel with one another on a first surface of said thin plate and a further plurality of the ribbons being arranged on the other surface of said thin plate in parallel with one another and crossed at right angle with and opposed through said thin plate of a single crystal of silicon to any of the ribbons of the first plurality so that the ribbons on both surfaces are arranged in parallel with each other in the cross section, said regrown layers containing gold and at least one III group element and having higher specific resistance than that of the matrix single crystal of silicon and a thickness of less than 1.2 microns.

6. A semiconductor device having bilaterally bistable characteristics comprising a thin piece of a single crystal of silicon having a specific resistance of more than 300 ohm cm. and the thickness of less than 1 mm., said thin piece of a single crystal of silicon being cut so as to correspond its upper and lower surfaces to a (100) crystallographic surface, and two regrown layers of silicon being respectively formed in a downward tetragonal pyramid from the upper surface of said single crystal of silicon and an upward tetragonal pyramid from the lower surface thereof and the tips of said two regrown layers being arranged to be opposed to each other through said single crystal of silicon, said two regrown layers of silicon containing gold and having the specific resistance higher than that of the matrix single crystal of silicon and a thickness of less than 10 microns.

7. A semiconductor device having bilaterally bistable characteristics comprising a thin piece of single crystal of n-type silicon having a specific resistance of more than 300 ohm cm. and the thickness of less than 1 mm., said thin piece of a single crystal of silicon being cut so as to correspond its upper and lower surfaces to a (100) crystallographic surface, and two regrown layers of silicon being respectively formed in a downward tetragonal pyramid from the upper surface of said single crystal of silicon and an upward tetragonal pyramid from the lower surface thereof and the tips of said two regrown layers being arranged to be opposed to each other through said single crystal of silicon, said two regrown layers of silicon containing gold and at least one V-group element and having the specific resistance higher than that of the matrix single crystal of silicon and a thickness of less than 10 microns.

8. A semiconductor device having bilaterally bistable characteristics comprising a thin piece of a single crystal of p-type silicon having a specific resistance of more than 300 ohm cm. and the thickness of less than 1 mm., said thin piece of a single crystal of silicon being cut so as to correspond its upper and lower surfaces to a (100) crystallographic surface, and two regrown layers of silicon being respectively formed in a downward tetragonal pyramid from the upper surface of said single crystal of silicon and an upward tetragonal pyramid from the lower surface thereof and the tips of said two regrown layers being arranged to be opposed to each other through said single crystal of silicon, said two regrown layers of silicon containing gold and at least one III group element and having the specific resistance higher than that of the matrix single crystal of silicon and a thickness of less than 10 microns.

References Cited by the Examiner

UNITED STATES PATENTS

| | | | |
|---|---|---|---|
| 2,860,218 | 11/1958 | Dunlap | 317—239 |
| 2,871,377 | 1/1959 | Tyler et al. | 317—239 |
| 2,897,377 | 7/1959 | Nelson et al. | 317—235 |
| 3,060,018 | 10/1962 | Desmond | 148—1.5 |

JOHN W. HUCKERT, *Primary Examiner.*

JAMES D. KALLAM, L. ZALMAN, V. LAFRANCHI, *Assistant Examiners.*